Figure 1:
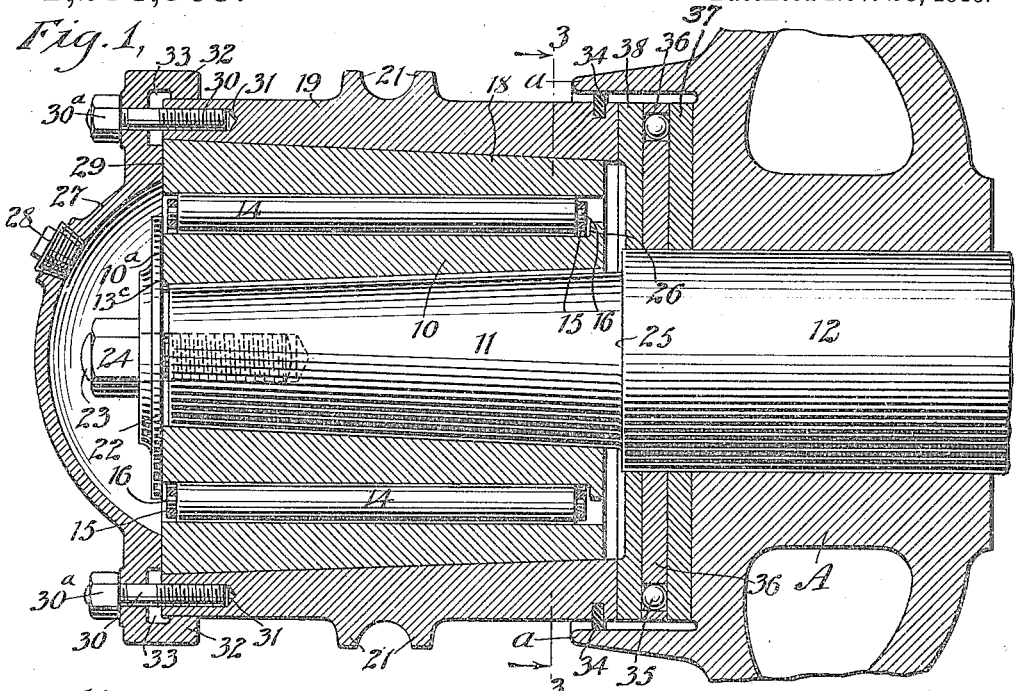

G. F. BLUME.
ROLLER BEARING.
APPLICATION FILED FEB. 7, 1916.

1,206,505. Patented Nov. 28, 1916.

WITNESSES
Edw. Thorpe

INVENTOR
George Fred Blume
BY Munn & Co
ATTORNEYS

UNITED STATES PATENT OFFICE.

GEORGE FRED BLUME, OF RICHMOND, INDIANA.

ROLLER-BEARING.

1,206,505.  Specification of Letters Patent.  Patented Nov. 28, 1916.

Application filed February 7, 1916. Serial No. 76,771.

*To all whom it may concern:*

Be it known that I, GEORGE FRED BLUME, a citizen of the United States, and a resident of Richmond, in the county of Wayne and State of Indiana, have invented a new and Improved Roller-Bearing, of which the following is a full, clear, and exact description.

My invention is intended more particularly for use in connection with axles of steam or electric railway cars although capable of use for other purposes.

The invention provides means whereby the roller bearing will be protected against damage by endwise pressure, and provides inner and outer bearing members for the rollers of a character that will permit the elements to be removed with facility for renewing any of the parts.

The structural form of the invention also possesses various advantages that will appear from the more specific description hereinafter given.

Reference is to be had to the accompanying drawings forming a part of this specification in which similar reference characters indicate corresponding parts in all the views.

Figure 2:
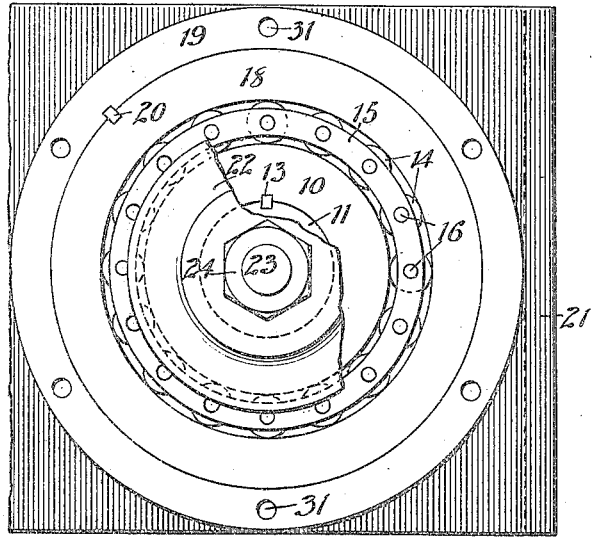
Figure 3:
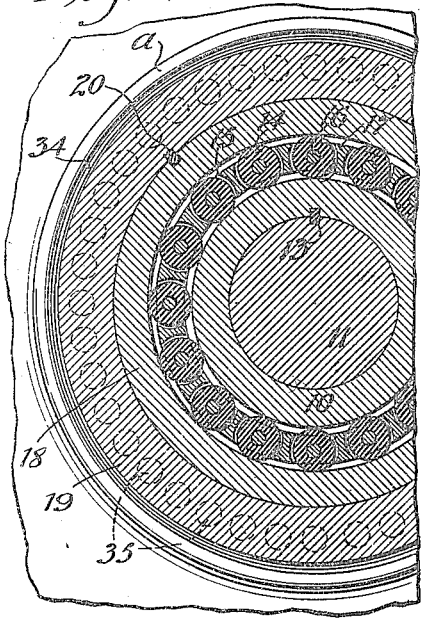

Figure 1 is a sectional plan view of a roller bearing embodying my invention; Fig. 2 is an end view, the end cap being omitted and parts broken away; and Fig. 3 is a transverse section on the line 3—3, Fig. 1.

In constructing a practical embodiment of my invention in accordance with the illustrated example, an inner bearing sleeve 10 is provided which is tapered at the interior to receive the tapered end 11 of an axle 12. The sleeve 10 is held to the tapered end 11 of the axle by a key 13, or equivalent means.

An annular series of rollers 14 is provided at the exterior of the sleeve 10, the exterior surfaces of the said sleeve and the rollers being parallel with the axis of the axle 12. The rollers 14 are carried in an annular cage designated generally by the numeral 15. Said cage 15 includes an annular series of longitudinally disposed pins 16, constituting the axes for the rollers 14, there being intervening bars 17 between the said pins, the ends of the cage being in the form of rings. At the outside of the rollers 14 and the roller carrying cage 15, is an outer sleeve 18, the interior surface of which is parallel with the axis of the axle 12 and the rollers 14, while the outer surface of the sleeve is tapered the reverse of the inner surface of the sleeve 10. Thus, a bearing made up jointly of the inner sleeve 10 and the outer sleeve 18, tapers inwardly at the exterior and tapers outwardly at the interior, thereby facilitating the removal of the said bearing from the correspondingly tapered annular space formed by the tapered axle and the shell 19. At the same time the bearing surfaces are parallel with the axis.

The outer bearing sleeve 18 is accommodated in an outer shell 19 which is square at the outer side and at the inside is formed and tapered to correspond with the exterior surface of the bearing sleeve 18. The sleeve 18 is fixed, being suitably fastened to the shell 19, the means shown for the purpose consisting of a key 20. At the sides the shell 19 is formed with grooved guides 21 to engage members (not shown) on the car as in the usual manner.

At the outer end of the axle 12 is a washer 22, which is secured to the end of the axle by a stud 23 and nut 24 or other suitable means. The washer 22 is machined at the inner side to bear against the machined outer end of the inner bearing sleeve 10, and said washer has a diameter to extend at its periphery beyond the said sleeve 10 and overlap the roller carrying cage 15, thereby presenting an annular shoulder at the outer end of the said cage.

A shoulder 25 is produced on the axle 12 at the base of the tapered end 11 and the sleeve 10 has a length sufficiently less than the distance between the said shoulder 25 and the washer 22 to permit adjustment to take up wear.

At the inner end of the cage 15 the sleeve 10 is formed with an annular flange 26 presenting a shoulder at the inner end of the cage 15. The length of the rollers 14 and their retaining cage 15 is less than the distance between the shoulder 26 and the washer 22, so that the said rollers and cage are protected against crushing by end thrust while being effectively retained against displacement and free to turn relatively to the bearing sleeves 10 and 18.

A cap 27 covers the end of the axle and the end of the bearing elements, said cap having a screw plug 28 or the like to permit of lubricating the bearing. At the inner face of the cap 27, the same is machined on an annular zone 29 to bear against the machined outer end of the outer bearing sleeve 18. The cap 27 is secured to the outer end of the shell 19 preferably by studs 30, which are received in threaded recesses 31 in said shell, said studs having nuts 30ª. At the inner side the cap 27 has an annular flange 32 overlapping the shell 19 and snugly fitting the latter. An annular recess 33 is formed at the base of the flange 32 between the same and the machined face 29 of the cap 27. The arrangement insures a dust-proof closure of the bearing box since the said cap can be secured firmly in position with its machined face 29 against the outer sleeve 18. Also, adjustment of the sleeve 18 to take up wear can be effected through the medium of the studs 30 and cap 27, whereby to move said cap inwardly, its machined face 29 constituting a follower acting against the said sleeve 18, and the recess 33, permitting the flange 32 of the cap to move inwardly on the shell 19.

At the inner end the bearing sleeve 18 extends within an annular flange $a$ formed on the hub of the car wheel A, part of which is shown in Fig. 1. Preferably, there is a felt washer or ring 34 on the said shell 19 at the inner end and held in an annular groove in the said shell to exclude dust.

An end thrust bearing is provided at the inner end of the shell and preferably includes an annular series of bearing balls 35 in a retainer or carrying plate 36, which is received between bearing plates 37, 38 that fit the end of the axle 12, within the flange $a$ of the car wheel.

It will be clear that the elements 10, 18 by reason of the taper thereof can be readily removed for the renewal of parts; that adjustment to take up wear can be effected with facility; that the bearing rollers are provided against crushing by end thrust and that the bearing is protected against dust both at the inner and outer ends.

Having thus described my invention I claim as new, and desire to secure by Letters Patent:—

1. An axle and bearing therefor, said axle having a tapered end and having a shoulder at the base of the tapered end and the bearing including a sleeve tapered to fix said axle, and rollers disposed about said sleeve; together with a washer secured to the end of the axle, the sleeve and rollers having a length sufficiently less than the distance between the washer and shoulder to adjust the washer and sleeve on the tapered end of the axle.

2. A bearing including inner and outer sleeves, rollers between said sleeves, a shell in which the outer sleeve is received, said shell and outer sleeve being reversely tapered, and a cap closing the outer end of the shell and adjustable thereon, the said cap bearing against the outer sleeve to constitute a follower in adjusting the same.

3. A bearing including inner and outer sleeves, rollers between said sleeves, a shell in which the outer sleeve is received, said shell and outer sleeve being reversely tapered, and a cap closing the outer end of the shell and adjustable thereon, said cap having a flange overlapping the shell and formed with an annular recess at the base of the said flange between the same and the outer sleeve, and receiving the outer end of the shell.

4. A bearing including inner and outer sleeves, rollers between said sleeves, a shell in which the outer sleeve is received, said shell and outer sleeve being reversely tapered, a cap covering the outer end of the shell and bearing against the outer end of the outer sleeve, and means adjustably connecting the cap with the end of the shell to adjust the cap to and from the shell and outer sleeve.

In testimony whereof I have signed my name to this specification in the presence of two subscribing witnesses.

GEORGE FRED BLUME.

Witnesses:
EUGENE CARLSON,
J. V. HARE.